(12) United States Patent
Hong

(10) Patent No.: US 7,378,631 B2
(45) Date of Patent: May 27, 2008

(54) IMAGE PROJECTION APPARATUS FOR ADJUSTING WHITE BALANCE IN CONSIDERATION OF LEVEL OF LIGHT EMITTED FROM LED AND METHOD THEREOF

(75) Inventor: Seung-cheol Hong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 130 days.

(21) Appl. No.: 11/353,045

(22) Filed: Feb. 14, 2006

(65) Prior Publication Data

US 2006/0215122 A1 Sep. 28, 2006

(30) Foreign Application Priority Data

Mar. 9, 2005 (KR) .................. 10-2005-0019677

(51) Int. Cl.
*G09G 3/00* (2006.01)
(52) U.S. Cl. .................. 250/205; 345/32; 345/207
(58) Field of Classification Search .............. 250/205; 345/32, 207, 7, 3.4; 359/196
See application file for complete search history.

(56) References Cited

U.S. PATENT DOCUMENTS 6,628,248 B2 * 9/2003 Masumoto .................. 345/32

FOREIGN PATENT DOCUMENTS

| JP | 2001-117164 | 4/2001 |
|---|---|---|
| JP | 2004-163527 | 6/2004 |
| KR | 10-2004-0014636 | 2/2004 |
| KR | 10-2004-0053750 | 6/2004 |
| KR | 10-2004-0054480 | 6/2004 |

\* cited by examiner

*Primary Examiner*—Georgia Epps
*Assistant Examiner*—Tony Ko
(74) *Attorney, Agent, or Firm*—Roylance, Abrams, Berdo & Goodman, LLP

(57) ABSTRACT

An image projection apparatus which adjusts a white balance in consideration of levels of light emitted from light-emitting diodes and a white balance adjustment method thereof. The image projection apparatus comprises a light source unit for sequentially emitting lights generated by a red (R)-light emitting element, a green (G)-light emitting element, and a blue (B)-light emitting element. An image generation unit generates an image using the lights sequentially emitted from the light source unit and projecting the image. A driving unit drives the light source unit and the image generation unit. A light sensor measures levels of lights generated by the R-light emitting element, the G-light emitting element, and the B-light emitting element. A controller controls a driving operation of the driving unit based on the levels of lights measured by the light sensor to adjust a white balance of the image projected from the image generation unit.

8 Claims, 5 Drawing Sheets

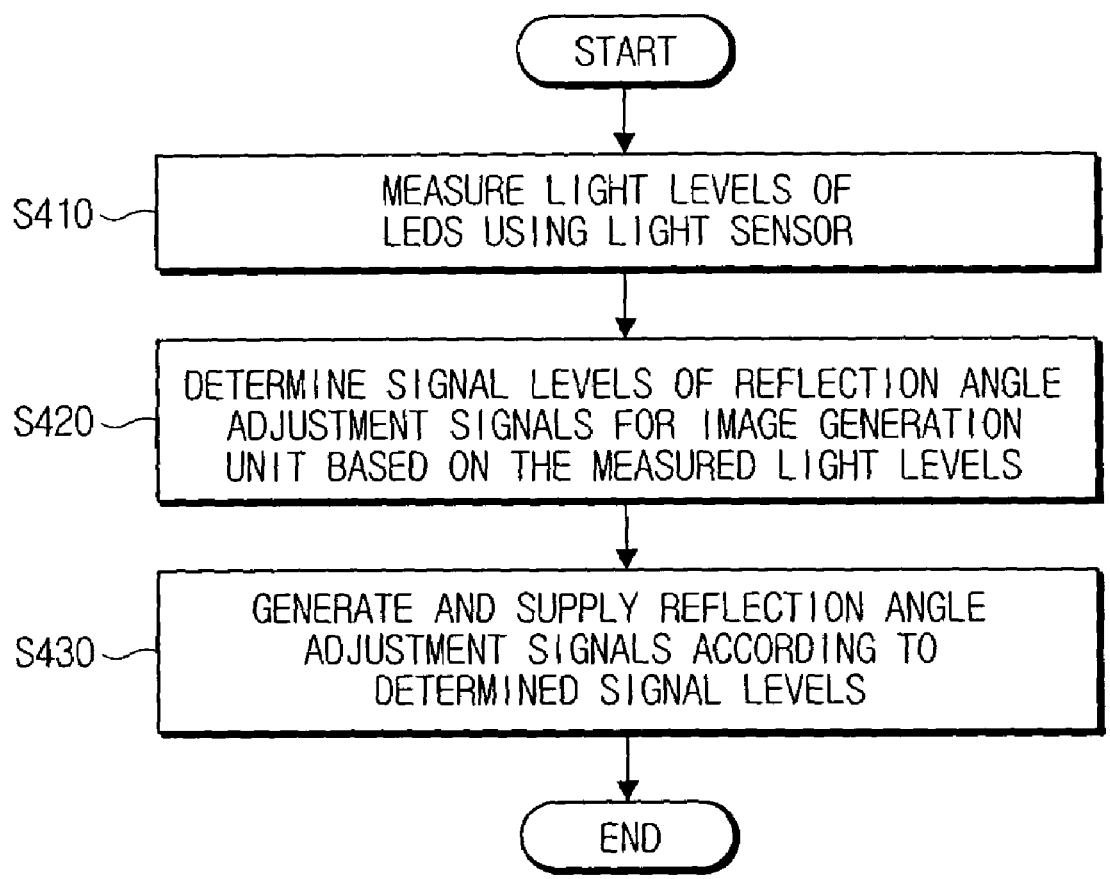

(a) R-LIGHT LEVEL=G-LIGHT LEVEL=B-LIGHT LEVEL=100

(b) R-LIGHT LEVEL = 92%
G-LIGHT LEVEL = 97%
B-LIGHT LEVEL = 99%

(c) R-LIGHT LEVEL = 92%
G-LIGHT LEVEL = 97%
B-LIGHT LEVEL = 99%

IMAGE PROJECTION APPARATUS FOR ADJUSTING WHITE BALANCE IN CONSIDERATION OF LEVEL OF LIGHT EMITTED FROM LED AND METHOD THEREOF

CROSS-REFERENCE TO RELATED APPLICATIONS

This application claims benefit under 35 U.S.C. §119(a) of Korean Patent Application No. 2005-19677, filed on Mar. 9, 2005, the entire content of which is hereby incorporated by reference.

BACKGROUND OF THE INVENTION

1. Field of the Invention

The present invention relates to an image projection apparatus and a white balance adjustment method thereof. More particularly, the present invention relates to an image projection apparatus which uses a light emitting diode as a light source and a white balance adjustment method thereof.

2. Description of the Related Art

An image projection apparatus receives an image signal, forms an image corresponding to the image signal, and projects the image on a screen. Such an image projection apparatus is called a "projector." The image projection apparatus typically adopts the following image forming process. White light emitted from a white lamp passes through a color wheel. The color wheel filters the white light into red (R)-light, green (G)-light and blue (B)-light in sequence. The R, G, and B-lights are modulated into a corresponding image by a digital micromirror device (DMD).

However, the white lamp has disadvantages of large bulk and high power consumption. Therefore, if the image projection apparatus uses the white lamp as a light source, the volume of the image projection apparatus becomes increased and power consumption is increased. This is more problematic if the white lamp is used as a light source in a portable image projection apparatus to be carried with a battery for power supply.

In order to solve this problem, an image projection apparatus using three color (red, green, blue) light emitting diodes (LEDs) as a light source has been suggested.

However, when the LEDs are driven for a long time, temperatures of the LEDs increase, which causes a reduction in levels of lights emitted from the LEDs. The degree of reduction of light level caused by the increase of temperature differs depending on the kind of LEDs and manufacturers of the LEDs. Accordingly, when the image projection apparatus using the LEDs as a light source is in use for a long time, deviations with respect to the levels of light from the LEDs become unacceptable. As a result, deviations with respect to amounts of R-light, G-light, and B-light become unacceptable.

The unacceptable deviations of the light amounts cause image degradation of the image provided to a user, and also require a white balance to be adjusted. Accordingly, there is a need for an improved image projection apparatus that is capable of adjusting a white balance in consideration of a level of light emitted from an LED and a corresponding method thereof.

SUMMARY OF THE INVENTION

The present invention has been developed in order to solve at least the above described problems in the related art and to provide other advantages. Accordingly, an aspect of the present invention is to provide an image projection apparatus which adjusts a white balance in consideration of a level of light emitted from a light source to prevent an image degradation, and a white balance adjustment method thereof.

In order to achieve the above aspects, an image projection apparatus comprises a light source unit for sequentially emitting lights generated by a red (R)-light emitting element, a green (G)-light emitting element, and a blue (B)-light emitting element. An image generation unit generates an image using the lights sequentially emitted from the light source unit and projects the image. A driving unit drives the light source unit and the image generation unit. A light sensor measures levels of lights generated by the R-light emitting element, the G-light emitting element, and the B-light emitting element. A controller controls a driving operation of the driving unit based on the levels of lights measured by the light sensor to adjust a white balance of the image projected from the image generation unit.

Preferably, but not necessarily, the driving unit comprises a light source driving unit for generating and supplying a driving pulse for the respective R-light emitting element, G-light emitting element, and B-light emitting element of the light source unit, thereby driving the light source unit. The controller determines levels of the driving pulses for the respective R-light emitting element, G-light emitting element, and B-light emitting element based on the level of light measured by the light sensor, and controls the light source driving unit to generate the driving pulses according to the determined pulse levels.

Preferably, but not necessarily, the driving unit comprises a light source driving unit for generating and supplying driving pulses for the respective R-light emitting element, G-light emitting elements, and B-light emitting element, thereby driving the light source unit. The controller determines pulse-widths and starting times of driving pulses for the respective R-light emitting element, G-light emitting element and B-light emitting element based on the levels of light measured by the light sensor, and controls the light source driving unit to generate the driving pulses according to the determined pulse-widths and staring times.

Preferably, but not necessarily, the driving unit comprises an image generation driving unit for generating reflection angle adjustment signals to adjust reflection angles for the lights sequentially entering the image generation unit from the light source for each pixel and supplying the reflection angle adjustment signals to the image generation unit such that the image generation unit generates and projects the image. The controller determines levels of the reflection angle adjustment signals based on the levels of lights measured by the light sensor and controls the image generation driving unit to generate reflection angle adjustment signals according to the determined levels of reflection angle adjustment signals.

According to an exemplary embodiment of the present invention, a method of adjusting a white balance of an image projection apparatus comprising a light source unit sequentially emitting lights generated by a red (R)-light emitting element, a green (G)-light emitting element, and a blue (B)-light emitting element, and an image generation unit for generating an image using the lights sequentially emitted from the light source and projecting the image, comprises: a) measuring levels of lights generated by the R-light emitting element, the G-light emitting element, and the B-light emitting element; and b) controlling a driving operation of one of the light source unit and the image generation unit based on the levels of lights measured to adjust a white balance of the image projected from the image generation unit.

Preferably, but not necessarily, step b) comprises: determining levels of driving pulses for the R-light emitting element, the G-light emitting element, and the B-light emitting element based on the levels of light measured by the light sensor; and supplying the driving pulses according to the determined driving pulse levels to the light source unit and driving the light source unit to adjust a white balance of the image projected from the image generation unit.

Preferably, but not necessarily, step b) comprises: determining pulse-widths and starting times of driving pulses for the R-light emitting element, the G-light emitting element and the B-light emitting element, respectively, based on the levels of light measured by the light sensor; and supplying the driving pulses according to the determined pulse-widths and starting times to the light source unit and driving the light source unit such that a white balance of the image projected from the image generation unit is adjusted.

Preferably, but not necessarily, step b) comprises: determining levels of reflection angle adjustment signals to adjust reflection angles for the lights sequentially entering the image generation unit from the light source unit for each pixel, based on the measured levels of lights; and supplying the reflection angle adjustment signals according to the determined signal levels to the image generation unit and allowing the image generation unit to generate and project the image, such that a white balance of the image projected from the image generation unit is adjusted.

BRIEF DESCRIPTION OF THE DRAWINGS

The above aspects and other advantages of the present invention become more apparent by describing exemplary embodiments of the present invention in greater detail with reference to the accompanying drawings, in which:

FIG. 2C is a flowchart showing a method of adjusting a white balance in consideration of a level of light emitted from a LED according to another exemplary embodiment of the present invention;

Throughout the drawings, like reference numbers will be understood to refer to like elements, features and structures.

DETAILED DESCRIPTION OF EXEMPLARY EMBODIMENTS

Hereinbelow, exemplary embodiments of the present invention will be described in greater detail with reference to the accompanying drawings.

Figure 1:
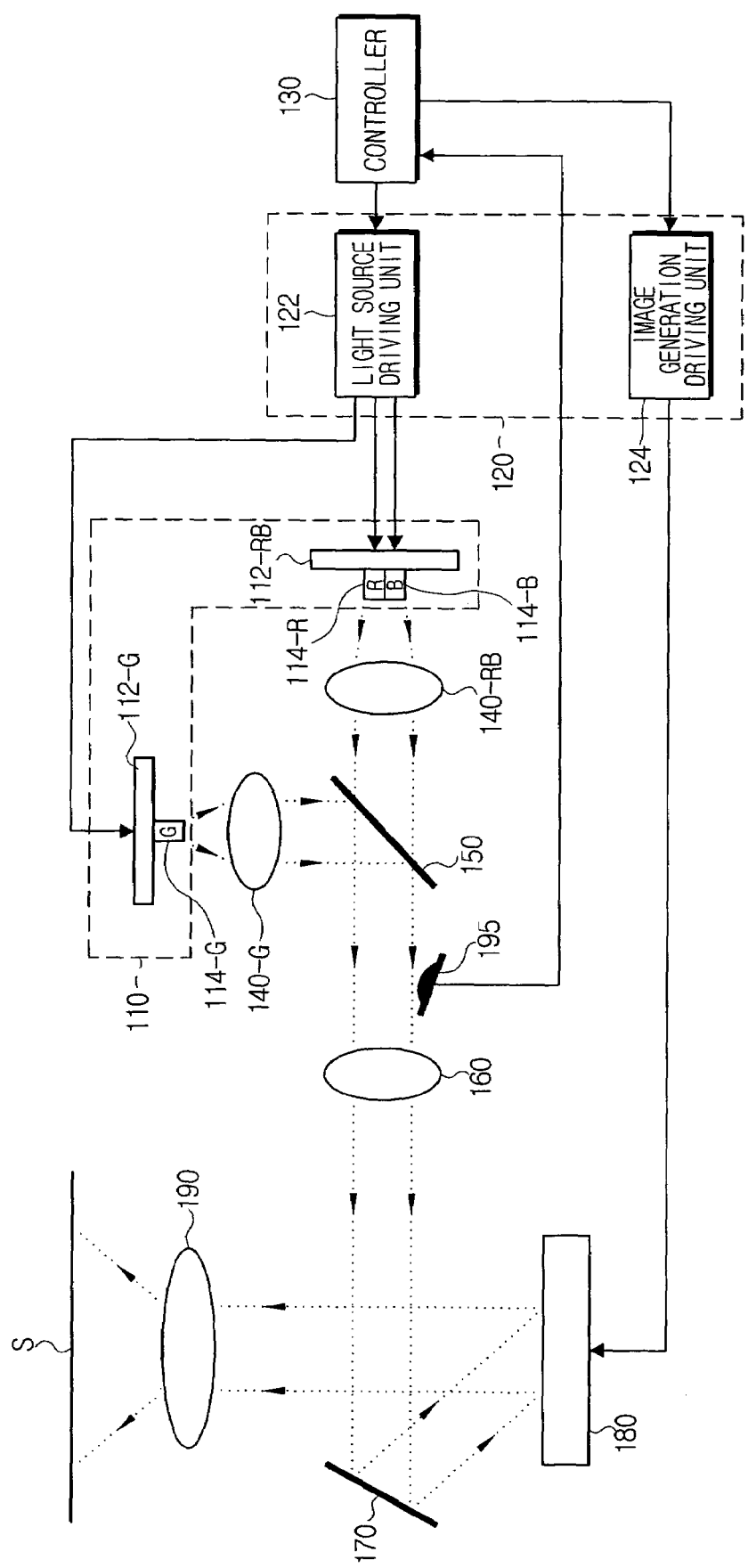
FIG. 1 is a block diagram showing an image projection apparatus which adjusts a white balance in consideration of a level of light emitted from a light emitting diode (LED) according to an exemplary embodiment of the present invention.

FIG. 1 is a block diagram showing an image projection apparatus according to an exemplary embodiment of the present invention. The image projection apparatus according to an exemplary embodiment of the present invention uses three-color light emitting diodes (LEDs), that is, red (R)-LED, green (G)-LED, and blue (B)-LED as a light source. The image projection apparatus according to an exemplary embodiment of the present invention takes levels of lights emitted from the LEDs into account in adjusting a white balance with respect to a projected image. In FIG. 1, solid-lines indicate paths for electric signals such as driving signals and control signals, and dotted-lines indicate paths for light beams.

Referring to FIG. 1, the image projection apparatus comprises a light source unit 110, a driving unit 120, a controller 130, a red-blue collimating lens (RB-CL) 140-BR, a green collimating lens (G-CL) 140-G, a light filter 150, a relay lens 160, a reflection mirror 170, an image generation unit 180, a projection lens 190, and a light sensor 195.

The light source unit 110 generates and emits red-light, green-light, and blue-light in sequence. If the image projection apparatus is driven according to the national television system committee (NTSC) scheme, the light source unit 110 emits the R-light for the first 1/180 second (1/3 of frame period), emits the G-light for the second 1/180 second, emits the B-light for the third 1/180 second, and then again emits the R-light for the 1/180 second. If the image projection apparatus is driven according to the phase alternation by line (PAL) scheme, the light source unit 110 emits the R-light, the G-light and the B-light in sequence in every 1/150 second.

The light source unit 110 comprises an RB-panel 112-RB, an R-LED 114-R, a B-LED 114-B, a G-panel 112-G, and a G-LED 114-G.

The R-LED 114-R and the B-LED 114-B are attached to the RB-panel 112-RB, and they generate and emit R-light and B-light, respectively. The R-LED 114-R and the B-LED 114-B are respectively driven by an R-driving pulse and a B-driving pulse which are generated by a light source driving unit 122, which will be described in greater detail below, and transmitted through a connector (not shown) provided in the RB-panel 112-RB.

The G-LED 114-G is attached to the G-panel 112-G, and it generates and emits G-light. The G-LED 114-G is driven by a G-driving pulse which is generated by the light source driving unit 122 and transmitted through a connector (not shown) provided in the G-panel 112-G.

The R-light or the B-light emitted from the R-LED 114-R or the B-LED 114-B is concentrated by the RB-CL 140-RB and passes through the light filter 150. Then, the R or B light is incident on the image generation unit 180 through the relay lens 160 and the reflection mirror 170.

The image generation unit 180 is driven by an image generation driving unit 124, which will be described below. The image generation unit 180 modulates the sequentially entering R-light, B-light, and G-light to generate an image. The image generation unit 180 projects the image on a screen. That is, the image generation unit 180 adjusts reflection angles with respect to the sequentially entering R-light, B-light, and G-light for each pixel to generate an image. The image generation unit 180 is embodied by a digital micromirror device (DMD). The image is projected from the image generation unit 180 on a screen S through the projection lens 190.

The driving unit 120 drives the light source unit 110 and the image generation unit 180 and comprises the light source driving unit 122 and the image generation driving unit 124.

The light source driving unit 122 generates the R-driving pulse, the G-driving pulse and the B-driving pulse to drive the R-LED 114-R, the G-LED 114-G and the B-LED 114-B, respectively, and supplies the generated driving pulses to the corresponding LEDs, thereby driving the LEDs in sequence.

The image generation driving unit 124 generates reflection angle adjustment signals to adjust the reflection angles with respect to the lights sequentially entering to the image generated unit 180 for each pixel, and supplies the generated reflection angle adjustment signals to the image generation unit 180 such that the image generation unit 180 generates and projects an image.

The light sensor 195 measures magnitudes of the R-light, the G-light, and the B-light sequentially emitted from the light source unit 110, and transmits the measurement results to the controller 130. That is, the light sensor 195 measures a level of light emitted from the R-LED 114-R (referred to as "R-light level" hereinbelow), a level of light emitted from the G-LED 114-G (referred to as "G-light level" hereinbelow), and a level of light emitted from the B-LED 114-B (referred to as "B-light level" hereinbelow).

The controller 130 controls the light source driving unit 122 and the image generation driving unit 124 to adjust a white balance of the image projected from the image generation unit 180. The controller 130 takes the measured light levels into account to more appropriately adjust the white balance.

Figure 2A:
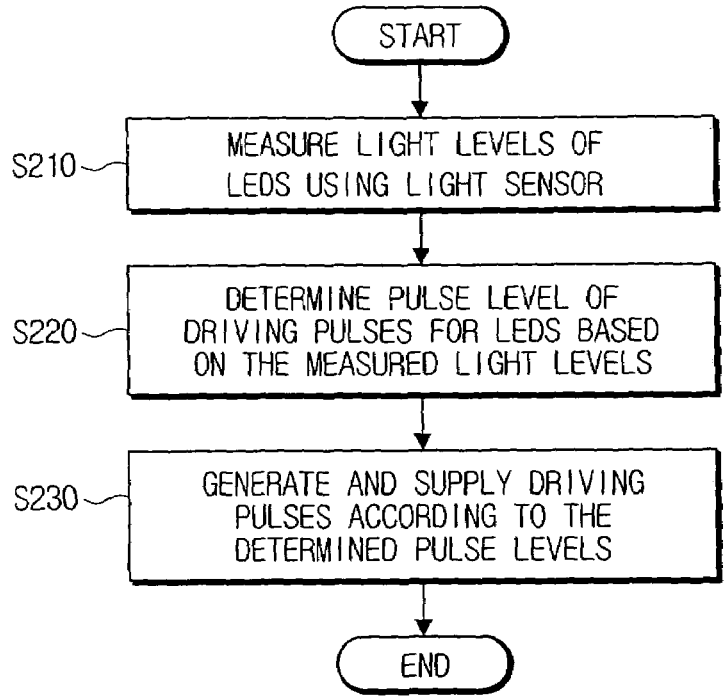
FIG. 2A is a flowchart showing a method of adjusting a white balance in consideration of a level of light emitted from a LED according to an exemplary embodiment of the present invention.

Hereinbelow, a white balance adjustment method of an image projection apparatus according to an exemplary embodiment of the present invention will be described with reference to FIG. 2A. FIG. 2A is a flowchart showing a method of adjusting a white balance in consideration of levels of lights emitted from LEDs.

Referring to FIG. 2A, levels of lights emitted from the LEDs are measured by the light sensor 195 at step S210. More specifically, the light sensor 195 sequentially measures a R-light level, a G-light level and a B-light level and transmits the measurement results to the controller 130.

Then, the controller 130 determines levels of driving pulses for the respective LEDs based on the measured light levels at step S220. That is, the controller 130 determines a level of R-light driving pulse (referred to as "R-driving pulse level" hereinbelow), a level of G-light driving pulse (referred to as "G-driving pulse level" hereinbelow) and a level of B-light driving pulse (refereed to as "B-driving pulse level") based on the measured light levels.

More specifically, if a certain light level decreases below a reference light level (100%), the controller determines a R-driving pulse level, a G-driving pulse level and a B-driving pulse level to increase the certain light level to 100%. That is, a highest increase of driving pulse level is determined for a LED having a highest decrease of light level, and a least increase of driving pulse level is determined for a LED having a least decrease of light level.

If the determination of the driving pulse levels is complete, the light source driving unit 122 generates driving pulses according to the determined driving pulse levels and supplies the driving pulses to corresponding LEDs at step S230.

Figure 3:
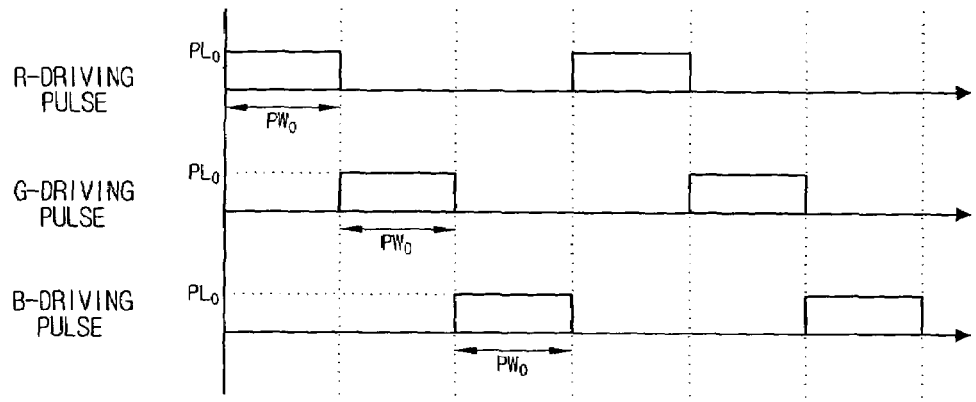
FIGS. 3A to 3C are views showing waveforms of LED driving pulses, according to an exemplary embodiment of the present invention.
Figure 3:
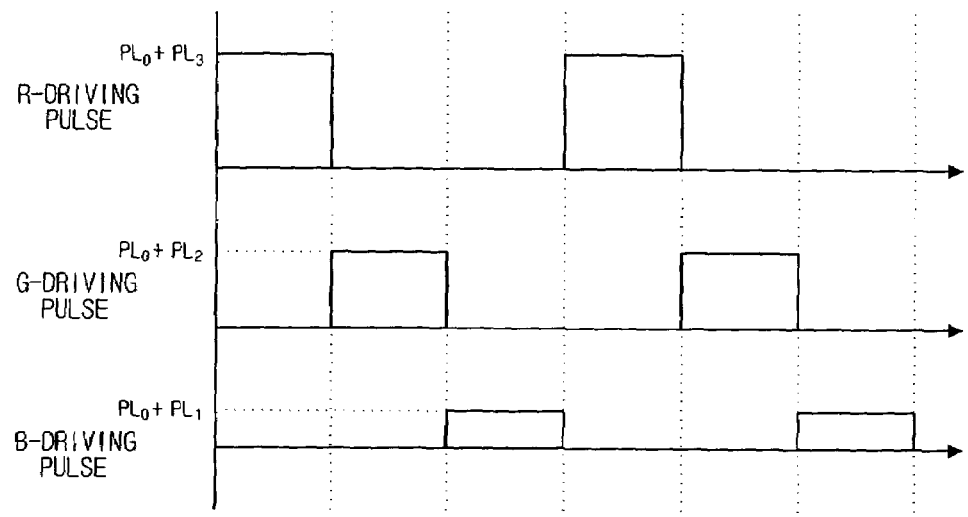
Figure 3:
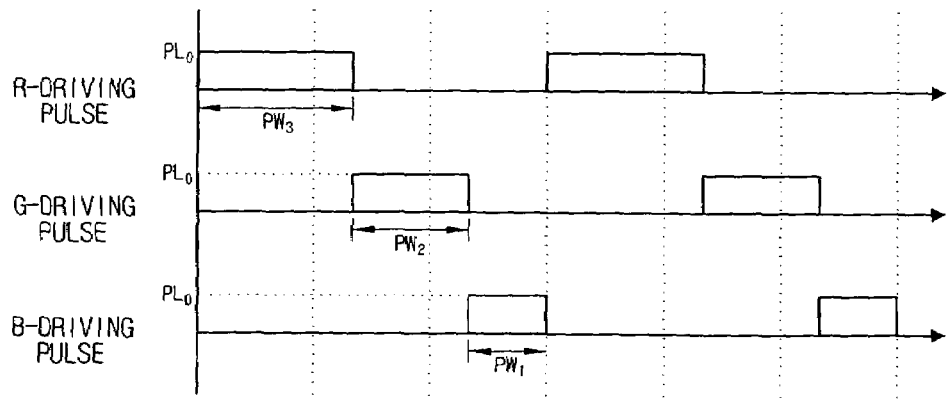

FIG. 3A shows an R-driving pulse, a G- driving pulse and a B-driving pulse generated by the light source driving unit 122 at the beginning of driving operation with 100% of R-light level, G-light level and B-light level, respectively. FIG. 3B shows an R-driving pulse, a G-driving pulse and a B-driving pulse generated by the light source driving unit 122 after a predetermined driving operation with 92% of R-light level, 97% of G-light level and 99% of B-light level.

As shown in FIG. 3A, since 100% of R-light level, G-light level and B-light level are provided, all of the R-driving pulse, the G-driving pulse and the B-driving pulse have the same reference pulse level $PL_0$.

On the other hand, as shown in FIG. 3B, since the R-light has the highest decrease of light level from 100% to 92%, the R-driving pulse has the highest increase of pulse level from $PL_0$ to $PL_0+PL_3$. Since the B-light has the least decrease of light level from 100% to 99%, the B-driving pulse has the least increase of pulse level from $PL_0$ to $PL_0+PL_1$. Accordingly, $PL_3>PL_2>PL_1$.

If the R-light level, the G-light level, and the B-light level decrease from 100% to 92%, 97%, 99%, respectively, the LEDs are driven with the driving pulses as shown in FIG. 3B, thereby having the R-light level, the G-light level and the B-light level reach 100%. As a result, R-light, G-light, and B-light incident on the image generation unit 180 have the same light amount such that the white balance of an image generated and projected from the image generation unit 180 can be adjusted.

Figure 2B:
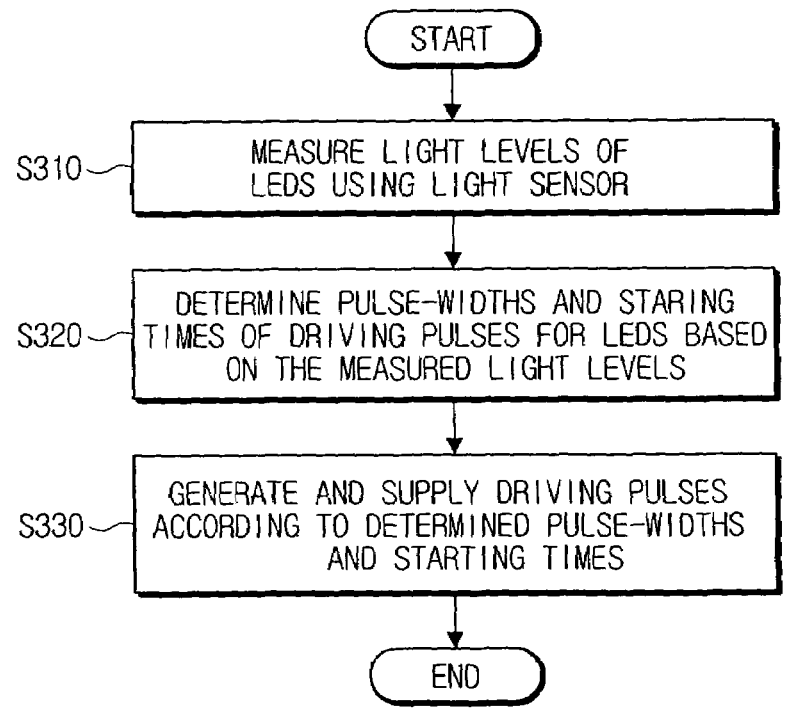
FIG. 2B is a flowchart showing a method of adjusting a white balance in consideration of a level of light emitted from a LED according to another exemplary embodiment of the present invention.

Hereinafter, a white balance adjustment method of an image projection apparatus according to another exemplary embodiment of the present invention will be described with reference to FIG. 2B. FIG. 2B is a flowchart showing a method of adjusting a white balance in consideration of levels of lights emitted from LEDs according to another exemplary embodiment of the present invention.

Referring to FIG. 2B, levels of lights emitted from the LEDs are measured by the light sensor 195 at step S310.

Then, the controller 130 determines pulse-widths and starting times of driving pulses for the respective LEDs based on the measured light levels at step S320. More specifically, the controller 130 determines a pulse-width and a starting time of a R-driving pulse based on the measured R-light level, determines a pulse-width and a starting time of a G-driving pulse based on the measured G-light level, and determines a pulse-width and a starting time of a B-driving pulse based on the measured B-light level.

If a certain LED has the highest decrease in the light level, a longest pulse width is determined for the driving pulse of the certain LED. If a certain LED has the least decrease in the light level, a shortest pulse-width is determined for the driving pulse of the certain LED.

The starting times of the respective driving pulses are determined such that driving pulses having different pulse-widths do not overlap with one another temporally.

If the determination of the pulse-width and the starting timing is complete, the light source driving unit 122 generates driving pulses according to the determined pulse-widths and starting times, and supplies them to corresponding LEDs.

FIG. 3A shows a R-driving pulse, a G-driving pulse, and a B-driving pulse generated by the light source driving unit 122 at the beginning of driving operation with 100% of R-light level, G-light level and B-light level, respectively. FIG. 3C shows a R-driving pulse, a G-driving pulse and a B-driving pulse generated by the light source driving unit 122 after a predetermine driving operation with 92% of R-light level, 97% of G-light level, and 99% of B-light level. In the case of FIG. 3A, since 100% of R-light level, G-light level and B-light level are provided, all of the R-driving pulse, the G-driving pulse and the B-driving pulse have the same reference pulse-width $PW_0$.

On the other hand, in the case of FIG. 3C, since the R-light level is less than the G-light level and the G-light level is less than the B-light level (92%<97%<99%), the R-driving pulse-width is broader than the G-driving pulse-width and the G driving pulse width is broader than B-driving pulse-width ($PW_3 > PW_2 > PW_1$). Also, starting times of the respective driving pulses change such that the R-driving pulse, the G-driving pulse and the B-driving pulse having different pulse widths do not overlap with one another temporally.

In the case of 92% of R-light level, 97% of G-light level and 99% of B-light level, when the LEDs are driven with the driving pulses as shown in FIG. 3C, a light-emitting time of the R-LED 114-4 having a relatively lower light level is prolonged, while a light-emitting time of the B-LED 114-B having a relatively higher light level is shortened. As a result, the R-light, the G-light, and the B-light incident on the image generation unit 180 have the same light amount such that a white balance of an image generated and projected from the image generation unit 180 can be adjusted.

Hereinafter, a white balance adjustment method of an image projection apparatus according to still another embodiment of the present invention will now be described with reference to FIG. 2C. FIG. 2C is a flowchart showing a method of adjusting a white balance in consideration of levels of lights emitted from LEDs according to still another exemplary embodiment.

Referring to FIG. 2C, levels of lights emitted from the LEDs are measured by the light sensor 195 at step S410.

Then, the controller 130 determines levels of reflection angle adjustment signals based on the measured light levels at step S420. The reflection angle adjustment signal is to adjust reflection angles of light (R-light, G-light, and B-light) sequentially entering the image generation unit 180 for each pixel. More specifically, at step S420, the controller 130 determines a R-reflection angle adjustment signal level, a G-reflection angle adjustment signal level, and a B-reflection angle adjustment signal level based on the measured light levels, respectively.

The highest increase of reflection angle adjustment signal level is determined for a LED having the highest decrease of light level, such that the light projected from the image generation unit 180 to the project lens 190 have the highest increase in the light level. On the other hand, the least increase of reflection angle adjustment signal level is determined for a LED having the least decrease of light level, such that the light projected from the image generation unit 180 to the projection lens 190 has the least increase in the light level.

In the case of 92% of R-light level, 97% of G-light level and 99% of B-light level, the R-reflection angle adjustment signal has the highest increase in the signal level, and thus, the R-light projected from the image generation unit 180 to the projection lens 190 has the highest increase in the light amount. On the other hand, the B-reflection angle adjustment signal has the least increase in the signal level, and thus, the B-light projected from the image generation unit 180 to the projection lens 190 has the least increase in the light level.

If the determination of reflection angle adjustment signal levels is complete, the image generation driving unit 134 generates reflection angle adjustment signals according to the determined signal levels, and supplies the same to the image generation unit 180.

If the image generation unit 180 is driven with the reflection angle adjustment signals generated at step S430, a light projected to the projection lens 190 with respect to the light having the highest decrease of light level has the highest increase in amount, whereas a light projected to the projection lens 190 with respect to the light having the least decrease of light level has the least increase in amount. As a result, a white balance of an image generated and projected from the image generation unit 180 is adjusted.

Up to now, light levels of the LEDs are measured by the light sensor 195, and a white balance is adjusted in consideration of the measured light levels.

There is no limitation to the location of the light sensor 195 provided in the image projection apparatus. Although in this embodiment the light sensor 195 is located between the light filter 150 and the relay lens 160 as shown in FIG. 1, the light sensor 195 can be located in any position of the path where projected lights travel. For example, the light sensor 195 may be located between the relay lens 160 and the reflection mirror 170, between the reflection mirror 170 and the image generation unit 180, between the image generation unit 180 and the projection lens 190, or between the projection lens 190 and the screen S.

In this embodiment, one R-LED 114-R and one B-LED 114-B are both attached to the RB-panel 112-RB, and one G-LED 114-G is attached to the G-panel 112-G. However, this should not be considered as limiting. The number of LEDs attached to a panel is not limited, and it is possible to provide any suitable number of LEDs or panels, as the particular design may require.

Figure 4:
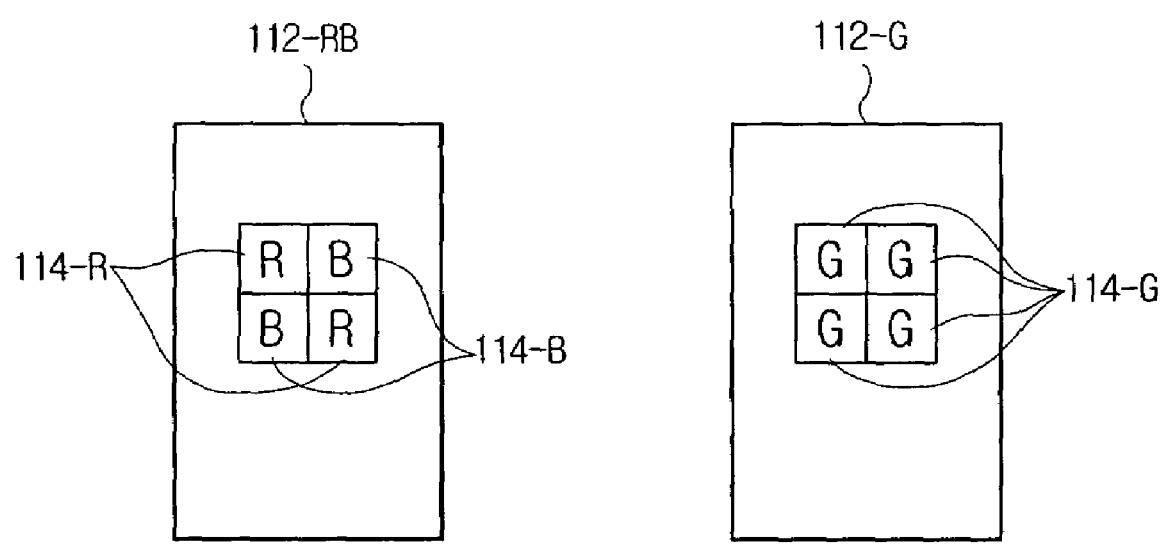
FIG. 4 is a view showing a light source unit embodied by a plurality of LEDs, according to an exemplary embodiment of the present invention.

FIG. 4 shows two R-LEDs 114-R and two B-LEDs 114-B attached to a RB-panel 112-RB, and four G-LEDs 114-G attached to a G-panel 112-G. The number (4) of G-LEDs 114-G is two times the number of R-LED 114-R or B-LED 114-B because the light emitted from the G-LED 114-G is weaker than the light emitted from the R-LED 114-R or B-LED 114-B in magnitude. However, if a G-LED 114-G of a greater light magnitude is used, the number of G-LEDs 114-G can be the same as that of R-LED 114-R or B-LED 114-B.

In this embodiment, the LEDs are attached to two divided panels. That is, the R-LED 114-R and the B-LED 114-B are attached to the RB-panel 112-RB and the G-LED 114-G is attached to the G-panel 112-G. This is for the convenience of designing the image projection apparatus. However, it should be understood that it is possible that all of the LEDs are attached to a single panel. That is, the RB-panel 112-RB and the G-panel 112-G are integrated into a single panel, and all of the R-LED 114-R, the B-LED 114-B and the G-LED 114-G are attached to the integrated single panel.

It is possible to realize a projection television using the image projection apparatus according to an exemplary embodiment of the present invention. This can be easily implemented by those of ordinary skill in the art, and thus, its detailed description is omitted.

As described above, the image projection apparatus according to exemplary embodiments of the present invention is capable of adjusting a white balance in consideration of light levels. Therefore, even if light levels are deviated from a reference value due to a prolonged use of the image projection apparatus, a white balance of a projected image is optimally adjusted. As a result, there is no image degradation and an optimal image can be provided to a user.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. An image projection apparatus comprising:
a light source unit for sequentially emitting lights generated by a red (R)-light emitting element, a green (G)-light emitting element, and a blue (B)-light emitting element;
an image generation unit for generating an image using the lights sequentially emitted from the light source unit and projecting the image;
a driving unit for driving the light source unit and the image generation unit, comprising an image generation driving unit for generating reflection angle adjustment signals to adjust reflection angles for the lights sequentially entering the image generation unit from the light source for each pixel and supplying the reflection angle adjustment signals to the image generation unit such that the image generation unit generates and projects the image;
a light sensor for measuring levels of lights generated by the R-light emitting element, the G-light emitting element, and the B-light emitting element; and
a controller for controlling a driving operation of the driving unit based on the levels of lights measured by the light sensor to adjust a white balance of the image projected from the image generation unit;
wherein the controller determines levels of the reflection angle adjustment signals based on the levels of lights measured by the light sensor and controls the image generation driving unit to generate reflection angle adjustment signals according to the determined levels of reflection angle adjustment signals.

2. The image projection apparatus as claimed in claim 1, wherein the driving unit comprises a light source driving unit for generating and supplying a driving pulse for the respective R-light emitting element, G-light emitting element, and B-light emitting element of the light source unit, thereby driving the light source unit, and
wherein the controller determines levels of the driving pulses for the respective R-light emitting element, G-light emitting element, and B-light emitting element based on the level of light measured by the light sensor, and controls the light source driving unit to generate the driving pulses according to the determined pulse levels.

3. The image projection apparatus as claimed in claim 1, wherein the driving unit comprises a light source driving unit for generating and supplying driving pulses for the respective R-light emitting element, G-light emitting elements, and B-light emitting element, thereby driving the light source unit, and
wherein the controller determines pulse-widths and starting times of driving pulses for the respective R-light emitting element, G-light emitting element and B-light emitting element based on the levels of light measured by the light sensor, and controls the light source driving unit to generate the driving pulses according to the determined pulse-widths and staring times.

4. The image projection apparatus as claimed in claim 1, wherein the image generation unit is implemented by a digital micromirror device (DMD).

5. A method of adjusting a white balance of an image projection apparatus comprising a light source unit for sequentially emitting lights generated by a red (R)-light emitting element, a green (G)-light emitting element, and a blue (B)-light emitting element, and an image generation unit for generating an image using the lights sequentially emitted from the light source and projecting the image, the method comprising:
a) measuring levels of lights generated by the R-light emitting element, the G-light emitting element, and the B-light emitting element; and
b) controlling a driving operation of one of the light source unit and the image generation unit based on the levels of lights measured by determining levels of reflection angle adjustment signals to adjust reflection angles for the lights sequentially entering the image generation unit from the light source unit for each pixel and supplying the reflection angle adjustment signals according to the determined signal levels to the image generation unit and allowing the image generation unit to generate and project the image, such that a white balance of the image projected from the image generation unit is adjusted.

6. The method as claimed in claim 5, wherein step b) comprises:
determining levels of driving pulses for the R-light emitting element, the G-light emitting element, and the B-light emitting element based on the levels of light measured by the light sensor; and
supplying the driving pulses according to the determined driving pulse levels to the light source unit and driving the light source unit to adjust a white balance of the image projected from the image generation unit.

7. The method as claimed in claim 5, wherein step b) comprises:
determining pulse-widths and starting times of driving pulses for the R-light emitting element, the G-light emitting element and the B-light emitting element, respectively, based on the levels of light measured by the light sensor; and
supplying the driving pulses according to the determined pulse-widths and starting times to the light source unit and driving the light source unit such that a white balance of the image projected from the image generation unit is adjusted.

8. The method as claimed in claim 5, wherein the image generation unit is implemented by a digital micromirror device (DMD).

* * * * *